July 1, 1958  H. J. HALL  2,841,242
METHOD FOR ELECTROSTATICALLY TREATING GASES
Filed Aug. 13, 1956
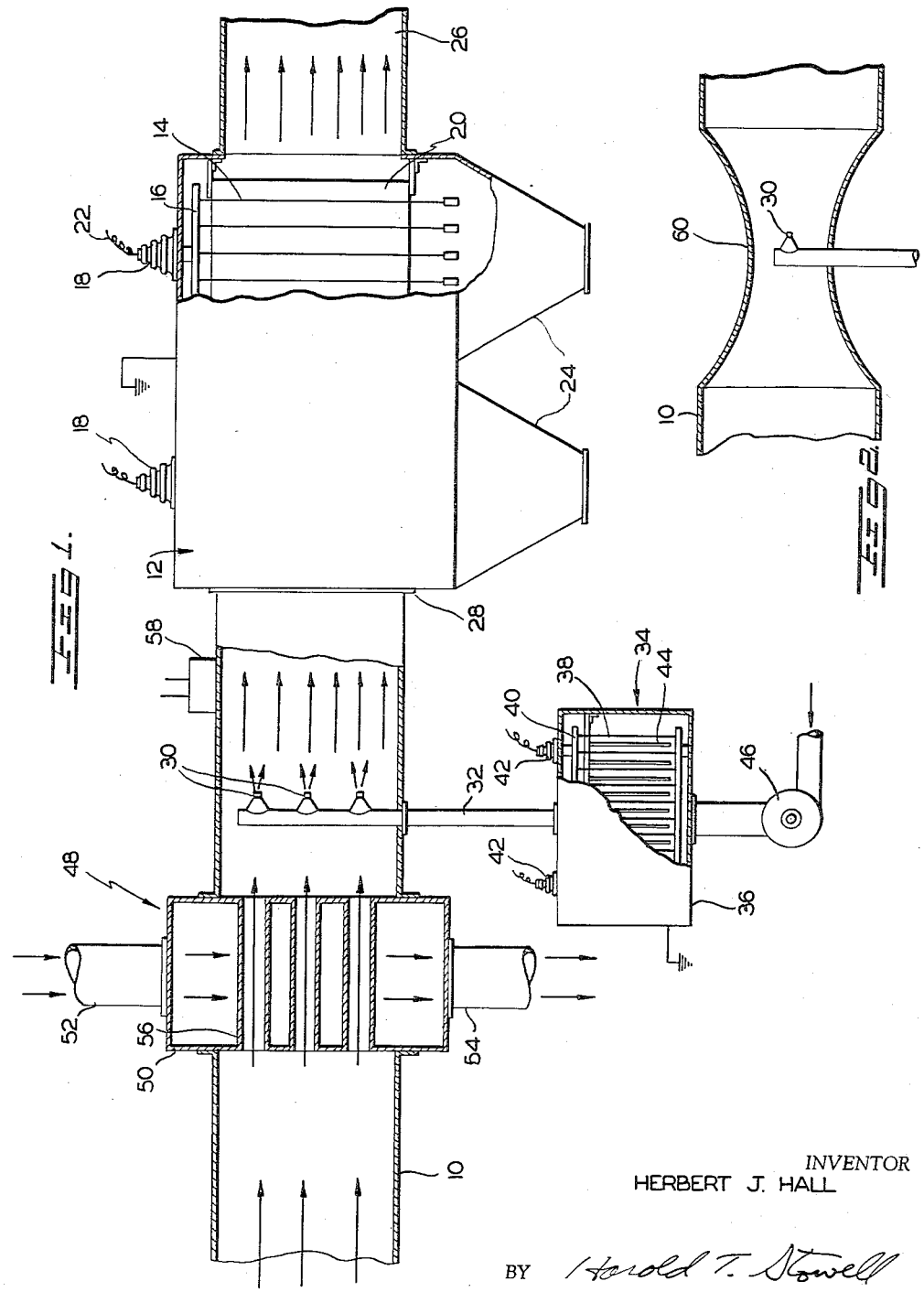
INVENTOR
HERBERT J. HALL
BY Harold T. Stowell
ATTORNEY

United States Patent Office 2,841,242
Patented July 1, 1958

2,841,242

METHOD FOR ELECTROSTATICALLY TREATING GASES

Herbert J. Hall, Hopewell Township, Princeton, N. J., assignor to Research-Cottrell, Inc., Bridgewater Township, Somerset County, N. J., a corporation of New Jersey Application August 13, 1956, Serial No. 603,565

3 Claims. (Cl. 183—114)

This invention relates to new and improved methods for electrostatically treating gases and in particular to an improved method for collecting suspended particulate material from flue gases containing a small percentage of sulfur dioxide.

It is a primary object of the present invention to provide improved collecting efficiency of flue gases by providing proper conductive conditions of the gas stream being treated, and by further providing for uniformity of such condition throughout the gas stream being treated.

A further object of the present invention is to provide such a method which is economically feasible to employ on waste gases having no commercial value.

A further object is to provide a method of treating flue gases which require little or no attention and the apparatus for carrying out such method may be conveniently applied to most existing electrostatic precipitation equipment.

These and other objects and advantages of the present invention are provided by a method of treating flue gases containing suspended fly ash and sulfur dioxide comprising the steps of directing a stream of ozone containing gas into the flue gases to be treated to bring about the formation of sulfur trioxide in the gas stream, and then directing the gas stream containing the suspended particulate material through a high potential electrostatic zone to precipitate the suspended particles.

The invention will be more particularly described with reference to the accompanying drawings wherein:

Fig. 1 is an elevational view in partial section of one form of the apparatus for carrying out the new and improved gas treating method; and Fig. 2 is a fragmentary sectional view of a modified form of apparatus for introducing the gas stream containing the ozone into the flue gases to be treated.

Referring to Fig. 1 of the drawings 10 is a conduit for directing flue gases containing suspended fly ash and a small percentage of sulfur dioxide to a standard electrostatic precipitator generally designated 12. The electrical precipitator includes fine wire discharge electrodes 14 carried by a bus bar 16 suspended from conventional insulators 18 secured to the top of the precipitator. Complementary extended surface plate type collecting electrodes 20 are interspaced between the parallel rows of discharge electrodes 14 whereby when a high potential current is directed to the electrodes through conductor 22 an electrostatic precipitating field is established between the discharge and collecting electrodes. The material collected from the gas stream passing through the electrostatic field is conveniently collected in hoppers 24 while the clean gas stream issues from the precipitator outlet conduit 26.

In carrying out the process of the present invention a stream of gas containing ozone is directed to the flue gases to be treated ahead of the inlet 28 of the electrostatic precipitator 12. In Fig. 1 the ozone containing gas is dispersed into the gas stream through a plurality of nozzles 30 connected to one or more conduits 32 which in turn are connected to an ozone generator such as the standard ozone generator generally designated 34.

The ozone generator generally comprises a shell or casing 36 within which a plurality of fine wire discharge electrodes 38 are fastened to bus bar 40 which in turn is suspended from the top of the generator by insulators 42. In order to increase the production of ozone in the ozone generator 34 fine wires of about 5 mils in diameter are preferably employed. The ozone generator also includes extended surface electrodes 44 secured in the space between each of the rows of discharge electrodes 38.

A blower or fan 46 forces air through the ozone generator and out the discharge nozzles 30.

While a specific form of ozone generator has been shown in the drawings, it is contemplated that other forms of ozone generating equipment may be employed in carrying out the improved gas treating method of the present invention.

Where the gas stream to be treated is hot and dry it is desirable to lower the temperature of the gases prior to the introduction of the ozone thereinto in order to prevent the loss of the ozone prior to its reaction with the sulfur dioxide contained in the flue gas. Where it is necessary to reduce the temperatures of the gas, a conventional heat exchange apparatus such as indicated at 48 may be inserted in the conduit 10 ahead of the ozone injecting nozzles 30.

The heat exchange apparatus shown in Fig. 1 comprises a casing 50 provided with a cooling air inlet 52 and a hot air discharge conduit 54. The air entering inlet 52 passes about the outer surface of a plurality of ducts 56 through which the flue gases pass. The air stream issuing from the outlet 54 of the heat exchange apparatus may be directed to a waste heat boiler or the like as is well known in the art.

Preferably it is desirable to lower the temperature of the gases prior to the introduction of the ozone containing gas to at least about 300° F. if the lowering to the temperature can be brought about without reaching the dew point of the gases as it has been found that the presence of water particles in the gas stream will reduce the available ozone for reaction with the sulfur dioxide in the flue gases.

In the operation of the apparatus shown in Fig. 1, hot flue gases issuing from a powdered coal boiler at the rate of about 100,000 cubic feet per minute is cooled in passing through the heat exchange apparatus 48 to about 300° F. Assuming that the sulfur dioxide concentration of the flue gas is about $\frac{1}{10}$ percent by volume, the total sulfur dioxide content at 300° F. would be about 100 cubic feet per minute. In order to convert all of the sulfur dioxide to sulfur trioxide by the introduction of ozone into the gas stream would require about 0.1 pound per minute of ozone. However, it has been found for effective conditioning of this gas stream having normal dust loading the presence of sulfur trioxide in the amount of from about .001 to about .005 percent by volume gives very satisfactory results. Thus, in order to obtain the improved results of the present invention, it is only necessary to convert from about 1 to about 2 percent of the available sulfur dioxide to sulfur trioxide. Thus, the introduction of about .13 pound per minute of ozone per 100,000 cubic feet per minute of flue gas will bring about the satisfactory conditioning of the gases prior to their introduction into the electrostatic precipitator 12.

In order to increase the utilization of the ozone directed into the gas stream in the production of sulfur trioxide, the gas stream may be subjected to ultrasonic vibrations which promote the rapid molecular contact of the sulfur dioxide with the ozone. For example, ultrasonic treatment may be provided by inserting a focusing barium-titanate transducer into the conduit 10 as shown at 58.

A further method of increasing the rapid molecular contact between the ozone and the sulfur dioxide is shown in Fig. 2 of the drawings wherein the duct 10 is provided with a venturi section 60 and the ozone outlet nozzle 30 is provided in the venturi constriction.

From the foregoing description it will be seen that the present invention provides a new and improved process for treating flue gases containing suspended fly ash and a small percentage of sulfur dioxide which fully accomplishes the aims and objects hereinbefore set forth.

Having thus described my invention and apparatus useful in carrying out the improved process, I claim:

1. A method of treating flue gas containing suspended fly ash and sulfur dioxide comprising the steps, directing a stream of ozone-containing gas into said flue gas to be treated to bring about the formation of sulfur trioxide in the gas stream and then directing the gas stream containing the suspended particulate material through a high potential electrostatic zone to precipitate the suspended particles.

2. The invention defined in claim 1 wherein the total sulfur trioxide formed in the gas stream is from about .002 to about 0.005 percent by volume of the flue gas being treated.

3. A method of treating flue gas containing suspended fly ash and sulfur dioxide comprising the steps producing ozone in a stream of air, directing the stream of air containing the ozone into said flue gas to be treated to bring about the formation of sulfur trioxide in the gas stream, and then directing the gas stream containing the suspended particulate material through a high potential electrostatic zone to precipitate the suspended particles.

References Cited in the file of this patent

UNITED STATES PATENTS 2,746,563   Harlow _____ May 22, 1956